(12) United States Patent
Yeh et al.

(10) Patent No.: US 8,791,915 B2
(45) Date of Patent: Jul. 29, 2014

(54) PORTABLE ELECTRONIC DEVICE

(75) Inventors: Yao-Wen Yeh, Taoyuan County (TW); I-Cheng Chuang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 128 days.

(21) Appl. No.: 13/413,665

(22) Filed: Mar. 7, 2012

(65) Prior Publication Data

US 2013/0082943 A1    Apr. 4, 2013

Related U.S. Application Data

(60) Provisional application No. 61/541,090, filed on Sep. 30, 2011.

(51) Int. Cl.

| | |
|---|---|
| *G06F 3/041* | (2006.01) |
| *G06F 3/038* | (2013.01) |
| *G09G 5/00* | (2006.01) |
| *G09G 3/34* | (2006.01) |
| *G06F 3/02* | (2006.01) |

(52) U.S. Cl.
USPC .............. 345/173; 345/211; 345/84; 345/169

(58) Field of Classification Search
USPC ............................................ 345/173, 211, 84
See application file for complete search history.

(56) References Cited

U.S. PATENT DOCUMENTS

| | | | | |
|---|---|---|---|---|
| 5,432,461 | A * | 7/1995 | Henley | 324/760.02 |
| 2007/0063957 | A1* | 3/2007 | Awakura et al. | 345/98 |
| 2008/0080040 | A1* | 4/2008 | Mimura et al. | 359/238 |
| 2009/0002331 | A1* | 1/2009 | Kamiya et al. | 345/173 |
| 2010/0304793 | A1 | 12/2010 | Kim et al. | |
| 2010/0328260 | A1* | 12/2010 | Chiu et al. | 345/174 |

FOREIGN PATENT DOCUMENTS

TW        201032195        9/2010

OTHER PUBLICATIONS

"Office Action of Taiwan Counterpart Application", issued on May 21, 2014, pp. 1-6.

* cited by examiner

*Primary Examiner* — Aneeta Yodichkas
(74) *Attorney, Agent, or Firm* — Jianq Chyun IP Office (57) ABSTRACT

A portable electronic device is provided suitable for operation by a single user. The portable electronic device comprises a main body and at least a thin film pattern. The main body has a display region and a non-display region coupled to the display region. The thin film pattern is disposed on a local region of the display region, on a local region of the non-display region, or on both a local region of the display region and a local region of the non-display region. The thin film pattern is visible while a user does not operate the portable electronic device. The thin film pattern is invisible while a user operates the portable electronic device.

22 Claims, 9 Drawing Sheets

PORTABLE ELECTRONIC DEVICE

CROSS-REFERENCE TO RELATED APPLICATION

This application claims the priority benefits of U.S. provisional application Ser. No. 61/541,090, filed on Sep. 30, 2011. The entirety of the above-mentioned patent application is hereby incorporated by reference herein and made a part of this specification.

BACKGROUND OF THE DISCLOSURE

1. Technical Field

The disclosure is related to an electronic device, and more particularly to a portable electronic device.

2. Background

Today, due to advanced communication technology, cell phone has become an indispensable device of our daily life. With a cell phone, not only may we communicate with each other, we may also browse web pages on the Internet, and here, the size of the display region of a cell phone may especially matters. In the prior art, most cell phones are stamped with symbols of their manufacturers. Such symbols may occupy a part of the surface region of the cell phones, hence limiting availability of space in the display region of the cell phones. In addition, most of the symbols in the prior art are made by methods of making a nameplate or by printing, and as a result, the cost of making the symbols is hard to reduce.

SUMMARY

The disclosure provides a portable electronic device, which has great flexibility in layout design.

The disclosure provides another portable electronic device, which also has great flexibility in layout design.

The disclosure provides still another portable electronic device, which also has great flexibility in layout design.

The disclosure provides a portable electronic device suitable for operation by a user. The portable electronic device comprises a main body, a touch panel mounted in the main body, and at least a thin film pattern disposed on a local region of the touch panel. The thin film pattern is visible while a user does not operate the portable electronic device, while the thin film pattern is invisible while a user operates the portable electronic device.

The disclosure provides a portable electronic device suitable for operation by a user. The portable electronic device comprises a main body, a display panel, and at least a thin film pattern. The main body has a display region and a non-display region coupled to the display region. The display panel is mounted in the display region of the main body. The thin film pattern is disposed on a local region of the display panel. The thin film pattern is visible while a user does not operate the portable electronic device, while the thin film pattern is invisible while a user operates the portable electronic device.

The disclosure provides a portable electronic device suitable for operation by a user. The portable electronic device comprises a main body and at least a thin film pattern. The main body has a display region and a non-display region coupled to the display region. The thin film pattern is disposed on a local region of the non-display panel. The thin film pattern is visible while a user does not operate the portable electronic device, while the thin film pattern is invisible while a user operates the portable electronic device.

In an embodiment of the disclosure, the touch panel comprises a light transmissive protection board, and a touch sensing layer disposed between the light transmissive protection board and the main body.

In an embodiment of the disclosure, the thin film pattern is disposed between the light transmissive protection board and the touch sensing layer.

In an embodiment of the disclosure, the light transmissive protection board is disposed between the thin film pattern and the touch sensing layer.

In an embodiment of the disclosure, while the user touches the touch panel, the touch sensing layer has an electric field variation, and the thin film pattern is invisible due to an impact of the electric field variation.

In an embodiment of the disclosure, the thin film pattern has a function of a two-way mirror.

In an embodiment of the disclosure, the thin film pattern is a thin metal layer.

In an embodiment of the disclosure, the material of the thin film pattern comprises a polymer dispersed liquid crystal (PDLC).

In an embodiment of the disclosure, the polymer dispersed liquid crystal comprises a nematic curvilinear aligned phase (NCAP) liquid crystal or a polymer network liquid crystal (PNLC).

In an embodiment of the disclosure, while the user operates the portable electronic device, the portable electronic device has an electric field variation or a magnetic field variation, and the thin film pattern is invisible due to an impact of the electric field variation or the magnetic field variation.

In an embodiment of the disclosure, the display panel comprises an active element array substrate, a facing substrate and a display medium. The facing substrate is opposite to the active element array substrate. The display medium is disposed between the active element array substrate and the facing substrate.

In an embodiment of the disclosure, the thin film pattern is disposed between the facing substrate and the display medium.

In an embodiment of the disclosure, the thin film pattern is disposed between the active element array substrate and the display medium.

In an embodiment of the disclosure, the active element array substrate is disposed between the thin film pattern and the display medium.

In an embodiment of the disclosure, the facing substrate is disposed between the thin film pattern and the display medium.

In an embodiment of the disclosure, the portable electronic device may further include a driving unit. The driving unit and the thin film pattern are electrically coupled. While a user operates the portable electronic device, the driving unit supplies power to the thin film pattern so as to make the thin film pattern invisible.

Based on the above, in the portable electronic device of the disclosure, the thin film pattern may be disposed in the display region, or in the non-display region, or in both the display region and the non-display region. Furthermore, the thin film pattern is visible while the user does not operate the portable electronic device, while the thin film pattern is invisible while the user operates the portable electronic device. Therefore, the portable electronic device of the disclosure has great flexibility in layout design.

In order to make the aforementioned features and advantages of the disclosure more comprehensible, embodiments accompanied with figures are described in detail below.

DETAILED DESCRIPTION

First Embodiment

Figure 1A:
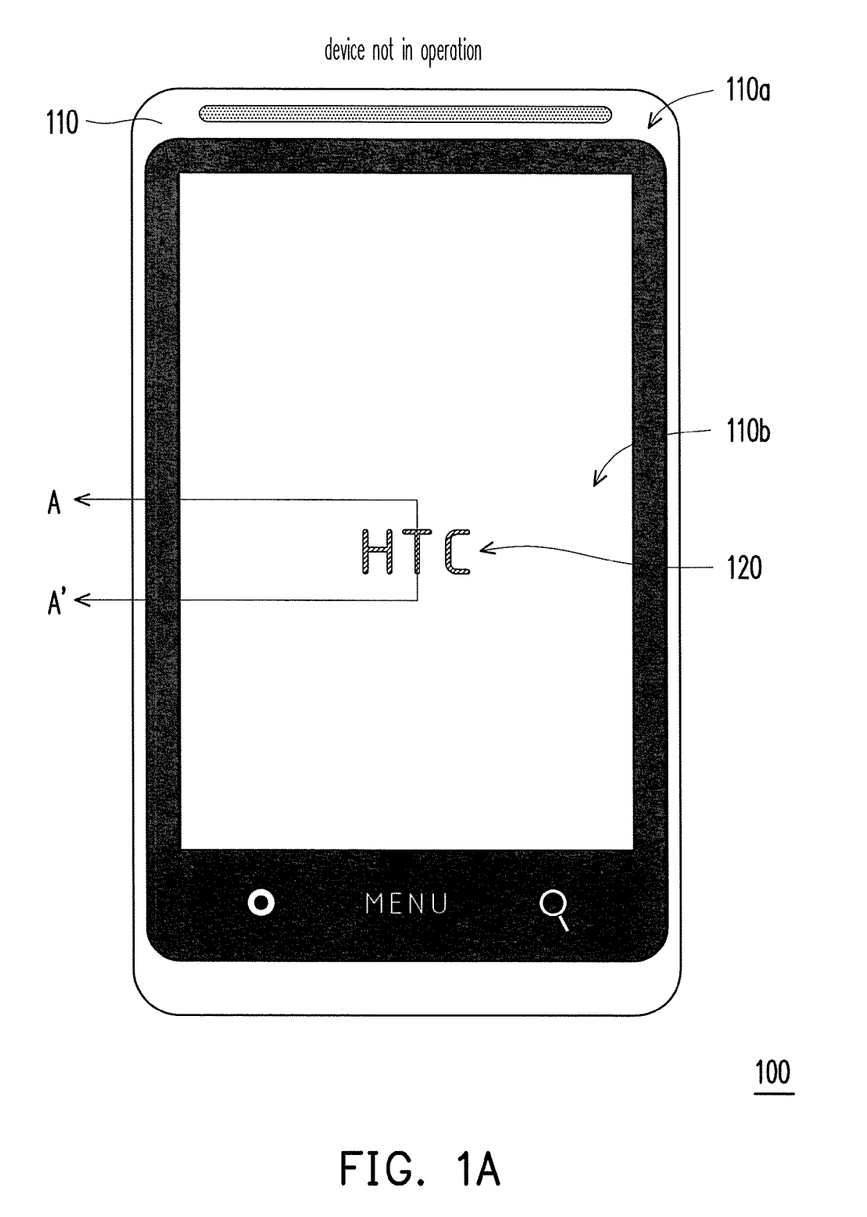
FIG. 1A is a top schematic view of a portable electronic device of the first embodiment of the disclosure not in operation.
Figure 1B:
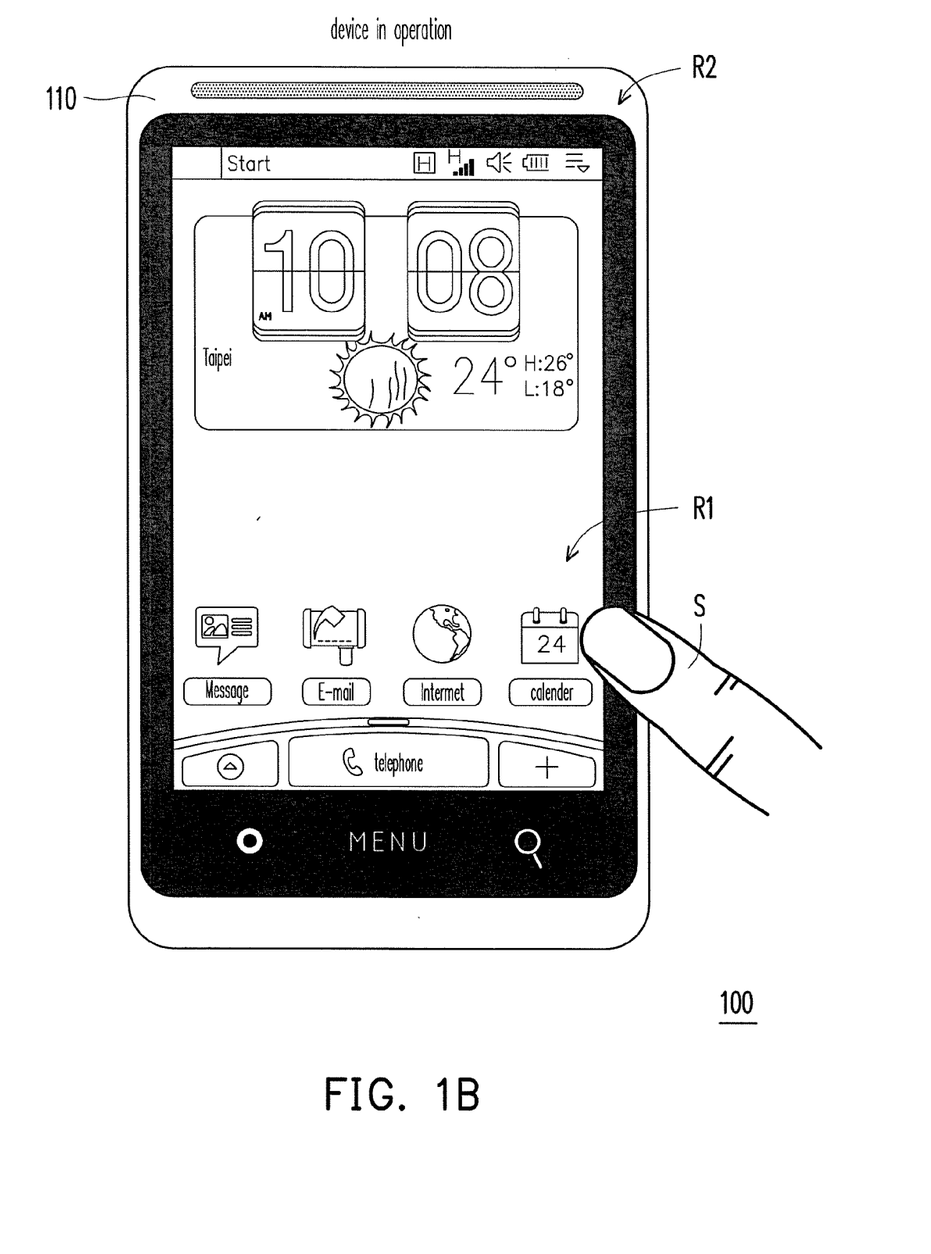
FIG. 1B a top schematic view of the portable electronic device of the first embodiment of the disclosure in operation.
Figure 2A:
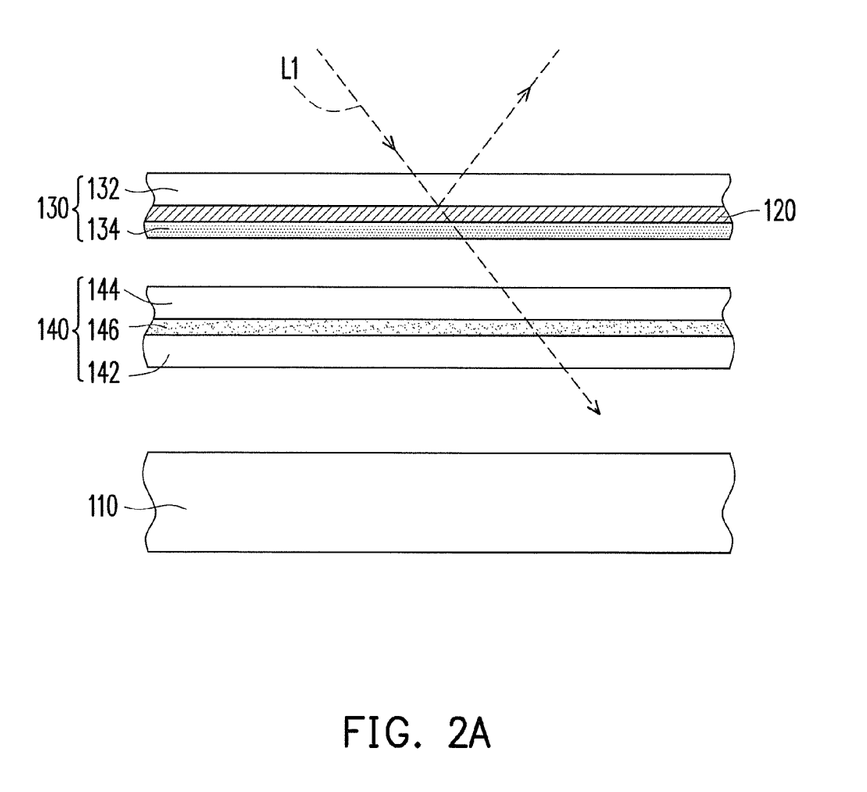
FIG. 2A is a cross-sectional view of FIG. 1A taken along a cross-sectional line A-A'.
Figure 2B:
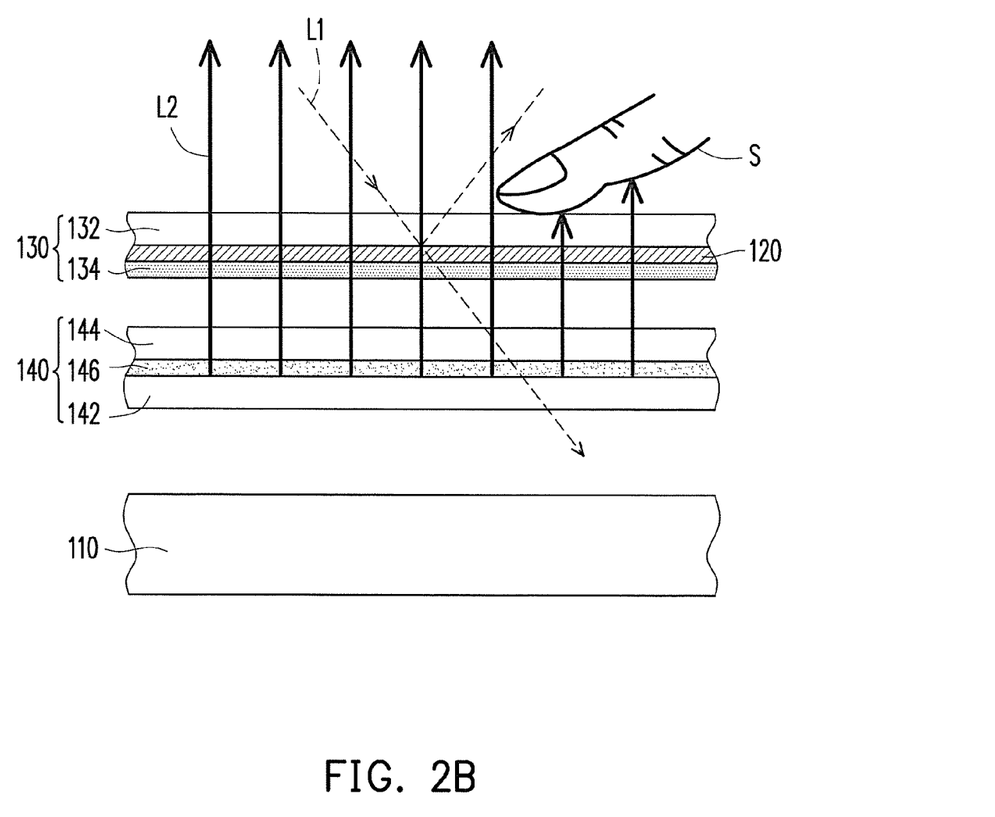
FIG. 2B is a cross-sectional view of FIG. 1B taken along the cross-sectional line A-A'.

FIG. 1A and FIG. 1B are top schematic views of a portable electronic device of the first embodiment of the disclosure. FIG. 2A and FIG. 2B are cross-sectional views of respectively FIG. 1A and FIG. 1B taken along a cross-sectional line A-A'. Specifically, FIG. 1A and FIG. 2A illustrate a state wherein the portable electronic device is not operated by a user, and FIG. 1B and FIG. 2B illustrate a state wherein the portable electronic device is operated by a user.

Referring to FIG. 1A, FIG. 1B, FIG. 2A and FIG. 2B, a portable electronic device 100 is suitable for operation by a user S. The portable electronic device 100 comprises a main body 110 and a thin film pattern 120. The main body 110 comprises a display region 110a and a non-display region 110b coupled to the display region 110a. In this embodiment, the thin film pattern 120 may be disposed on a local region of the display region 110a. However, the scope of the disclosure is not limited thereto. In other embodiments, the thin film pattern 120 may be disposed on a local region of the non-display region 110b. In addition, if the portable electronic device 100 comprises several thin film patterns 120, the thin film patterns 120 may be disposed both on a local region of the display region 110a and on a local region of the non-display region 110b at the same time.

As shown in FIG. 2A and FIG. 2B, the portable electronic device of this embodiment may selectively include a touch panel 130 mounted in the display region 110a of the main body 110, and a display panel 140 mounted in the display region 110a of the main body 110. In this embodiment, the display panel 140 may be between the main body 110 and the touch panel 130. The touch panel 130 of this embodiment comprises a light transmissive protection board 132, and a touch sensing layer 134 disposed between the light transmissive protection board 132 and the main body 110. The display panel 140 of this embodiment comprises an active element array substrate 142, a facing substrate 144 opposite to the active element array substrate 142, and a display medium 146 between the active element array substrate 142 and the facing substrate 144. In this embodiment, the thin film pattern 120 may be integrated into the touch panel 130. More specifically, the thin film pattern 120 may be disposed between the light transmissive protection board 132 and the touch sensing layer 134.

While the user S does not operate the portable electronic device 100, the thin film pattern 120 is visible. While the user S operates the portable electronic device 100, the thin film pattern 120 is invisible. For example, as shown in FIG. 2A and FIG. 2B, the thin film pattern 120 of this embodiment may cause a penetration of a partial reflection portion of an external light L1 transmitted to the thin film pattern 120. In other words, the thin film pattern 120 of this embodiment may have a function of a two-way mirror. In this embodiment, the thin film pattern 120 may be a thin metal layer, for example. However, the scope of the disclosure is not limited thereto. As shown in FIG. 2A, while the user S does not operate the portable electronic device 100, the display panel 140 does not provide any image beam, and thus a part of the external light L1 reflected by the thin film pattern 120 may easily be noticed by the user S, so as to make the user S clearly see the thin film pattern 120. On the other hand, as shown in FIG. 2B, while the user S operates the portable electronic device 100, the display panel 140 will provide an image beam L2. Here, the brightness of the part of the external light L1 reflected by the thin film pattern 120 is lower than the brightness of the image beam L2. Thus, the user S does not easily notice the part of the external light L1 reflected by the thin film pattern 120, so as to make the user S not easily notice the thin film pattern 120. In other words, when the user S starts to operate the portable electronic device 100, the user S may feel that the thin film pattern 120 disappears.

Figure 3:
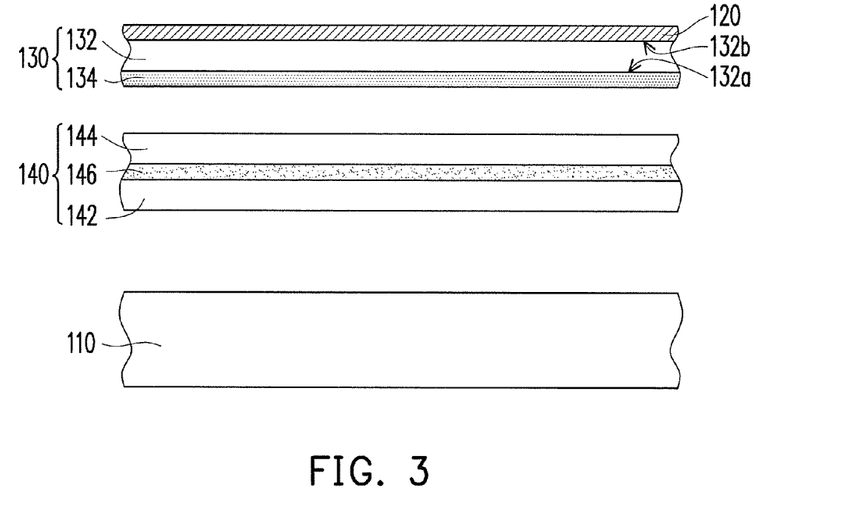
FIG. 3 is a cross-sectional view of a portable electronic device according to an embodiment of the disclosure.

It should be explained that the position of the thin film pattern 120 of the disclosure is not limited to the position as shown in FIG. 2A and FIG. 2B. In other embodiments, the thin film pattern 120 may be disposed at other appropriate positions. For example, FIG. 3 is a cross-sectional view of a portable electronic device according to another embodiment of the disclosure. Referring to FIG. 3, in this embodiment, the light transmissive protection board 132 of the touch panel 130 may include an inner surface 132a and an opposite outer surface 132b, wherein the inner surface 132a is between the outer surface 132b and the display panel 140. In this embodiment, the thin film pattern 120 may be disposed on the outer surface 132b of the touch panel 130 and may be in contact with the outer surface 132b.

Figure 4:
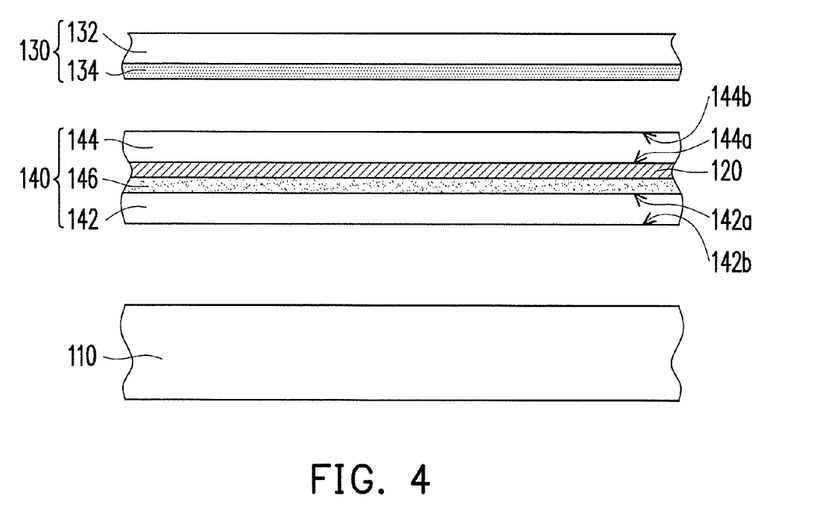
FIG. 4 is a cross-sectional view of a portable electronic device according to an embodiment of the disclosure.
Figure 5:
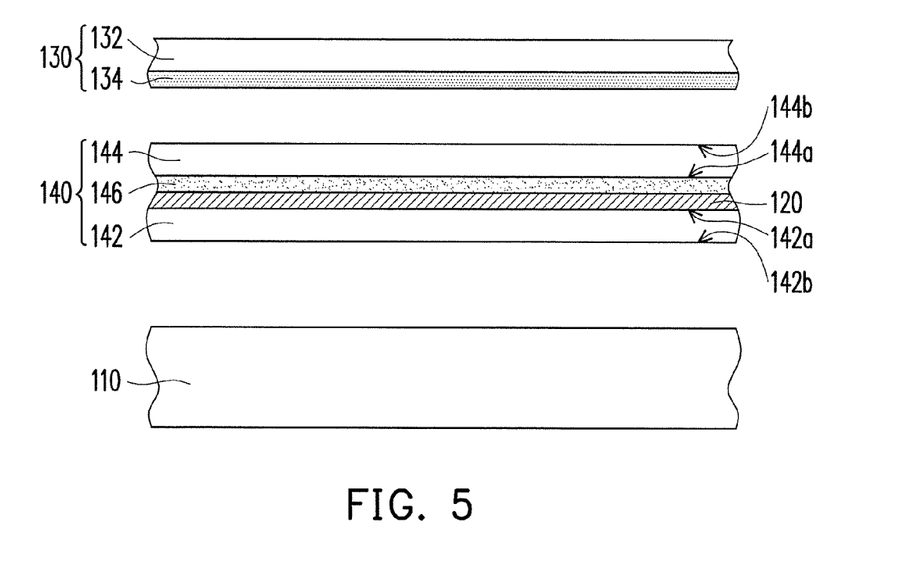
FIG. 5 is a cross-sectional view of a portable electronic device according to an embodiment of the disclosure.

FIG. 4 is a cross-sectional view of a portable electronic device according to still another embodiment of the disclosure. Referring to FIG. 4, in this embodiment, the thin film pattern 120 may be integrated into the display panel 140. Specifically, the thin film pattern 120 may be between the facing substrate 144 and the display medium 146 of the display panel 140. FIG. 5 is a cross-sectional view of a portable electronic device according to another embodiment of the disclosure. Referring to FIG. 5, in this embodiment, the thin film pattern 120 may be between the active element array substrate 142 and the display medium 146 of the display panel 140.

Figure 6:
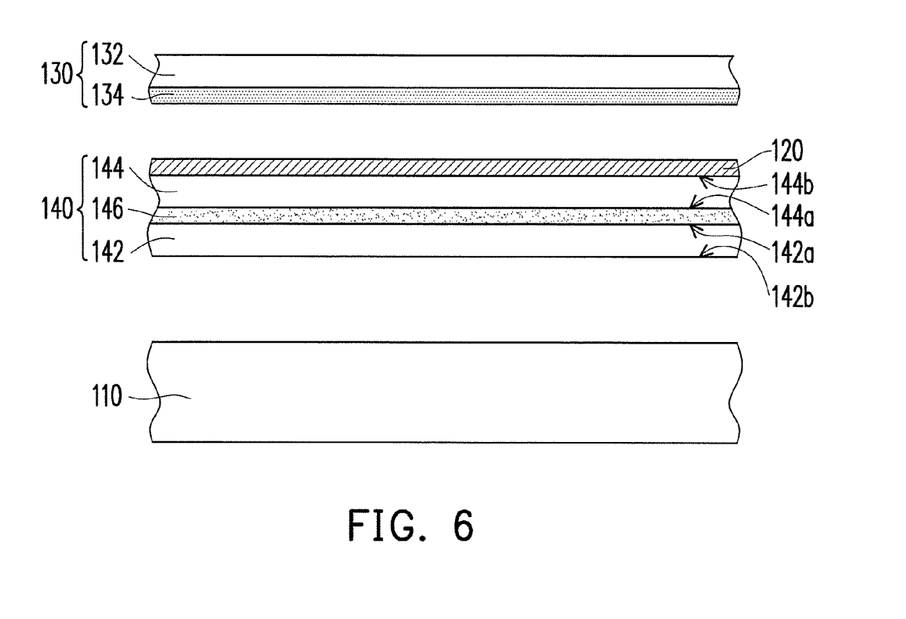
FIG. 6 is a cross-sectional view of a portable electronic device according to an embodiment of the disclosure.
Figure 7:
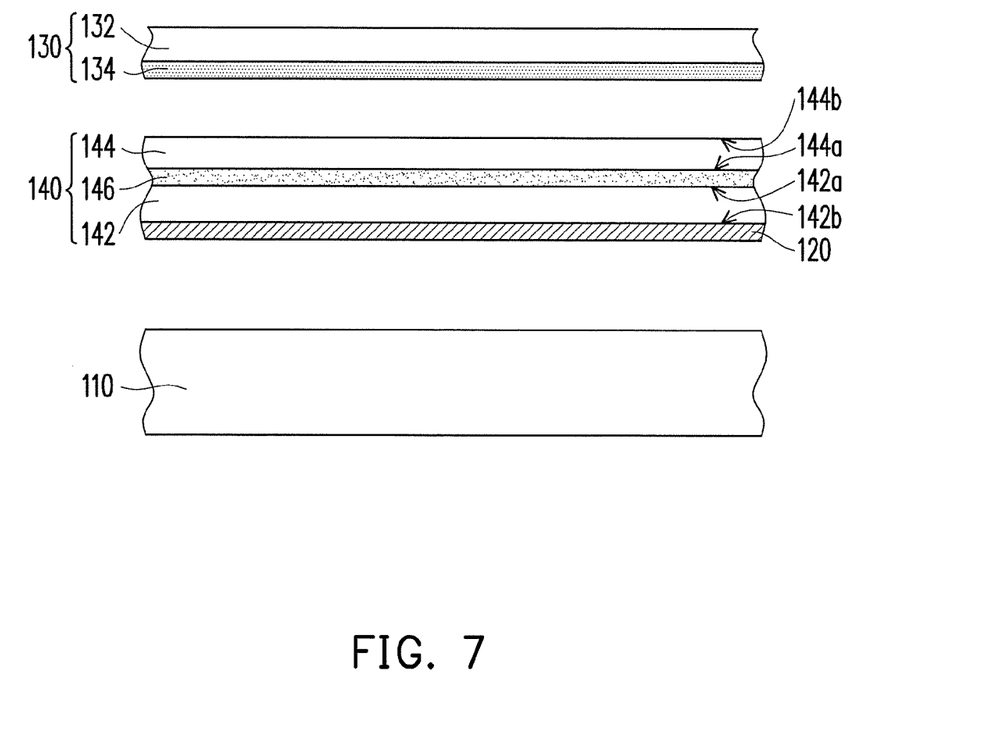
FIG. 7 is a cross-sectional view of a portable electronic device according to an embodiment of the disclosure.

FIG. 6 is a cross-sectional view of a portable electronic device according to an embodiment of the disclosure. Referring to FIG. 6, in this embodiment, the facing substrate 144 comprises an inner surface 144a and an opposite outer surface 144b, wherein the inner surface 144a is between the display medium 146 and the outer surface 144b. In this embodiment, the thin film pattern 120 may be disposed on the outer surface 144b and may be in contact with the outer surface 144b. FIG. 7 is a cross-sectional view of a portable electronic device according to another embodiment of the disclosure. Referring to FIG. 7, in this embodiment, the active element array substrate 142 comprises an inner surface 142a and an outer surface 142b, wherein the inner surface 142a is between the display medium 146 and the outer surface 142b. The thin film pattern 120 may be disposed on the outer surface 142b and may be in contact with outer surface 142b. The thin film pattern 120 in FIG. 3 to FIG. 7 may also have a function similar to the thin film pattern 120 in FIG. 2A and FIG. 2B, and an explanation thereon is hence omitted.

Second Embodiment

Figure 8A:
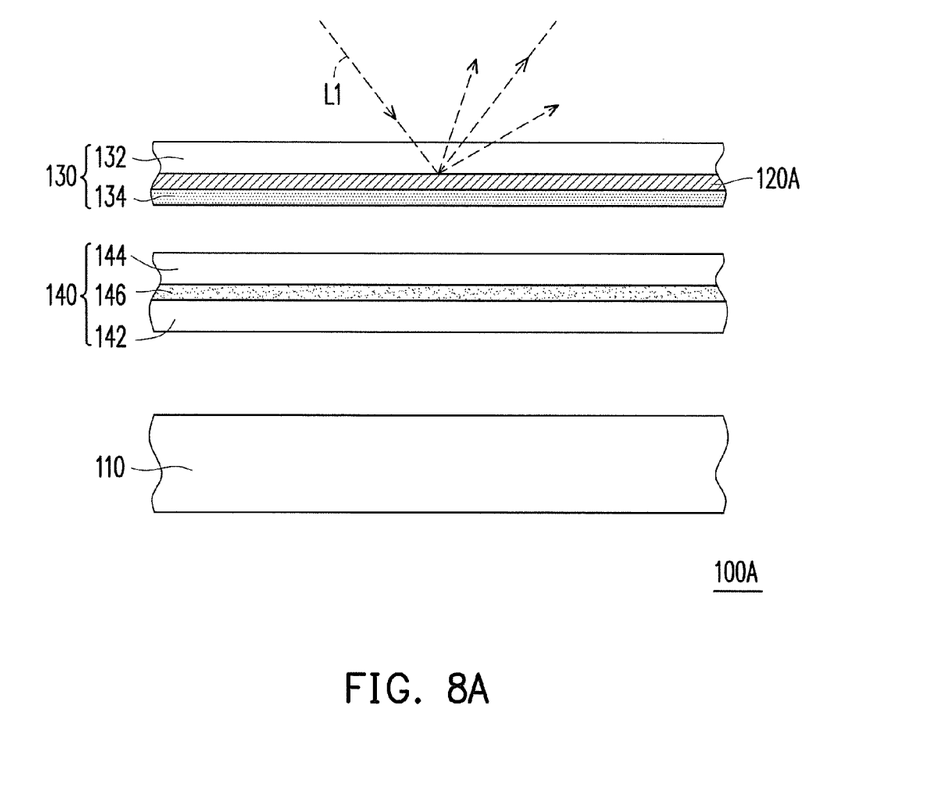
FIG. 8A is a cross-sectional view of a portable electronic device of the second embodiment of the disclosure not in operation.
Figure 8B:
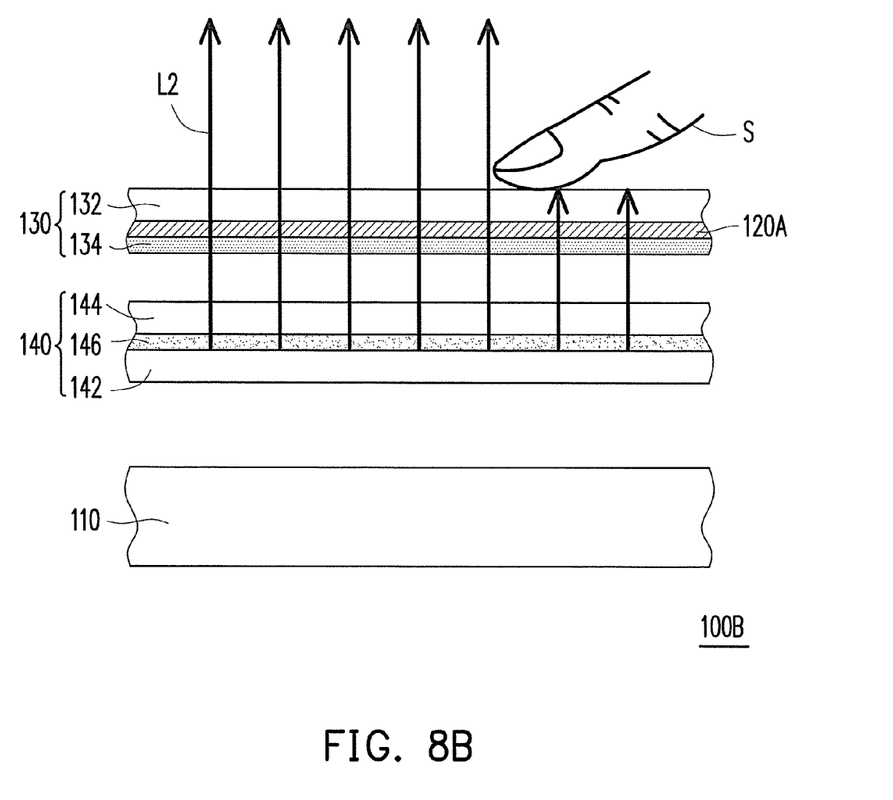
FIG. 8B is a cross-sectional view of a portable electronic device of the second embodiment of the disclosure in operation.

FIG. 8A and FIG. 8B are cross-sectional views of a portable electronic device of the second embodiment of the disclosure. Specifically, FIG. 8A illustrates a state wherein the portable electronic device is not operated by a user, and FIG. 8B illustrates a state wherein the portable electronic device is operated by a user. Referring to FIG. 8A and FIG. 8B, the portable electronic device 100A of this embodiment is similar to the portable electronic device 100 of the first embodiment, and thus identical reference numbers stand for identical elements. The difference between the portable electronic device 100A of this embodiment and the portable electronic device 100 of the first embodiment lies in that the working principle of the thin film pattern 120A of this embodiment differs from the working principle of the thin film pattern 120 of the first embodiment. Explanation of the identical parts between the two devices is omitted, and only the difference is explained hereinafter.

In this embodiment, the thin film pattern 120A may have a variation in physical property or in chemical property due to an impact of an electric field or a magnetic field, so as to make the thin film pattern 120A invisible. For example, the thin film pattern 120A of this embodiment may be a polymer dispersed liquid crystal (PDLC). The polymer dispersed liquid crystal comprises a nematic curvilinear aligned phase (NCAP) liquid crystal or a polymer network liquid crystal (PNLC). The thin film pattern 120A of this embodiment may be between the light transmissive protection board 132 and the touch sensing layer 134 of the touch panel 130. As shown in FIG. 8B, while the user S operates the portable electronic device 100A (e.g. touches the touch panel 130), the portable electronic device 100 will have an electric field variation (e.g. the touch sensing layer 134 will have an electric field variation). The electric field variation may make the polymer dispersed liquid crystal regularly arranged. Here, the external light L1 and the image beam L2 provided by the display panel 140 will penetrate the thin film pattern 120A, so as to make the thin film pattern 120A invisible.

On the other hand, as shown in FIG. 8A, while the user S does not operate the portable electronic device 100A of this embodiment (e.g. does not touch the touch panel 130), the thin film pattern 120A of this embodiment (i.e. the polymer dispersed liquid crystal) may be irregularly arranged. Accordingly, when the external light L1 is transmitted to the thin film pattern 120A, the thin film pattern 120A will scatter the external light L1. The user S may see the thin film pattern 120A through the external light L1 scattered by the thin film pattern 120A.

It should be explained that the material and operation modes of the thin film pattern 120A described in the previous two paragraphs are exemplary, and the material and operation modes of the thin film pattern 120A of the disclosure are not limited to the disclosure contained in the previous two paragraphs. In other embodiments, the thin film pattern 120A may be made of organic polymer materials, inorganic polymer materials, other nonlinear optoelectronic materials or polymers. The operation modes of the thin film pattern 120A may be invisible while being impacted by other electric fields or magnetic fields, and be visible while not being impacted by other electric fields or magnetic fields.

In addition, the position of the thin film pattern 120A of the disclosure is not limited to being between the light transmissive protection board 132 and the touch sensing layer 134. For example, in other embodiments, the thin film pattern 120A may be disposed at the position as the thin film pattern 120 shown in FIG. 3 to FIG. 7, or be disposed in the non-display region. When the thin film pattern 120A is disposed at the position as the thin film pattern 120 shown in FIG. 3 to FIG. 7 or is disposed in the non-display region, the thin film pattern 120A may not easily be impacted by an electric field of the touch sensing layer 134. Here, the portable electronic device 100A may further include a driving unit (not shown in the figures) electrically coupled to the thin film pattern 120A. While a user operates the portable electronic device 100A, the driving unit may supply power to the thin film pattern 120A so as to make the thin film pattern 120A visible. In other words, when the position of the thin film pattern 120A is not easily impacted by an electric field variation of the touch sensing layer 134, the portable electronic device 100A may use the driving unit to make the thin film pattern 120A invisible while the user operates the portable electronic device 100A, and to make the thin film pattern 120A visible while the user does not operate the portable electronic device 100A.

In conclusion to the above, in a portable electronic device of an embodiment of the disclosure, the thin film pattern is visible while the user does not operate the portable electronic device, and is invisible while the user operates the portable electronic device. Thus, the thin film pattern may be disposed in the display region, such that the portable electronic device of an embodiment of the disclosure has great flexibility in layout design.

In addition, in a portable electronic device of another embodiment of the disclosure, the thin film pattern may be disposed in the non-display region (e.g. on a back surface of the main body opposite to the display region, or on a peripheral face coupling the back surface and the display region), such that the portable electronic device of an embodiment of the disclosure has great flexibility in layout design.

Though the disclosure has been disclosed above by the embodiments, they are not intended to limit the disclosure. It will be apparent to one of ordinary skill in the art that modifications and variations to the described embodiments may be made without departing from the spirit and scope of the disclosure. Therefore, the protecting range of the disclosure falls in the appended claims.

What is claimed is:

1. A portable electronic device comprising:
a main body;
a touch panel coupled to the main body;
at least a thin film pattern disposed on a local region of the touch panel, wherein the thin film pattern s visible while the touch panel is not actuated, while the thin film pattern is invisible while the touch panel is actuated.
2. The portable electronic device as claimed in claim 1, wherein the touch panel comprises:
a light transmissive protection board; and
a touch sensing layer disposed between the light transmissive protection board and the main body.

3. The portable electronic device as claimed in claim 2, wherein the thin film pattern is disposed between the light transmissive protection board and the touch sensing layer.

4. The portable electronic device as claimed in claim 2, wherein the light transmissive protection board is disposed between the thin film pattern and the touch sensing layer.

5. The portable electronic device as claimed in claim 2, wherein the touch sensing layer has an electric field variation while the touch panel is actuated, and the thin film pattern is invisible due to an impact of the electric field variation.

6. The portable electronic device as claimed in claim 1, wherein the thin film pattern has a function of a two-way mirror.

7. The portable electronic device as claimed in claim 6, wherein the thin film pattern is a thin metal layer.

8. The portable electronic device as claimed in claim 1, wherein the material of the thin film pattern comprises: a polymer dispersed liquid crystal (PDLC).

9. The portable electronic device as claimed in claim 8, wherein the polymer dispersed liquid crystal comprises: a nematic curvilinear aligned phase (NCAP) liquid crystal or a polymer network liquid crystal (PNLC).

10. The portable electronic device as claimed in claim 1, wherein the touch panel has an electric field variation or a magnetic field variation while the touch panel is actuated, and the thin film pattern is due to an impact of the electric field variation or the magnetic field variation.

11. A portable electronic device comprising:
a main body having a display region and a non-display region coupled to the display region;
a display panel mounted in the display region of the main body; and
at least a thin film pattern disposed on a local region of the display panel, wherein the thin film pattern is visible while the display panel is not turned on, while the thin film pattern is invisible while the display panel is turned on.

12. The portable electronic device as claimed in claim 11, wherein the display panel comprises:
an active element array substrate;
a facing substrate opposite to the active element array substrate; and
a display medium between the active element array substrate and the facing substrate.

13. The portable electronic device as claimed in claim 12, wherein the thin film pattern is disposed between the facing substrate and the display medium.

14. The portable electronic device as claimed in claim 12, wherein the thin film pattern is disposed between the active element array substrate and the display medium.

15. The portable electronic device as claimed in claim 12, wherein the active element array substrate is disposed between the thin film pattern and the display medium.

16. The portable electronic device as claimed in claim 15, wherein the facing substrate is disposed between the thin film pattern and the display medium.

17. The portable electronic device as claimed in claim 11, wherein the thin film pattern has a function of a two-way mirror.

18. The portable electronic device as claimed in claim 17, wherein the thin film pattern is a thin metal layer.

19. The portable electronic device as claimed in claim 11, wherein the material of the thin film pattern comprises: a polymer dispersed liquid crystal (PDLC).

20. The portable electronic device as claimed in claim 19, wherein the polymer dispersed liquid crystal comprises: a nematic curvilinear aligned phase (NCAP) liquid crystal or a polymer network liquid crystal (PNLC).

21. The portable electronic device as claimed in claim 11, wherein the display panel has an electric field variation or a magnetic field variation while the display panel is turned on, and the thin film pattern is invisible due to an impact of the electric field variation or the magnetic field variation.

22. The portable electronic device as claimed in claim 21, wherein the portable electronic device further comprises: a driving unit electrically coupled to the thin film pattern, wherein the driving unit supplies power to the thin film pattern so as to make the thin film pattern invisible while the display panel is turned on.

* * * * *